Sept. 26, 1939.　　　　　B. C. PLACE　　　　　2,174,447
SECURING TRIM PANELS
Filed July 17, 1936
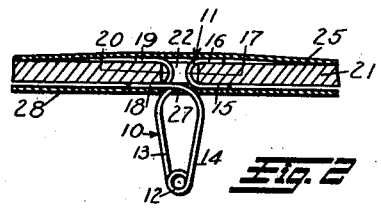
Fig. 2
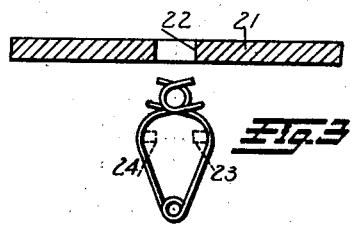
Fig. 3
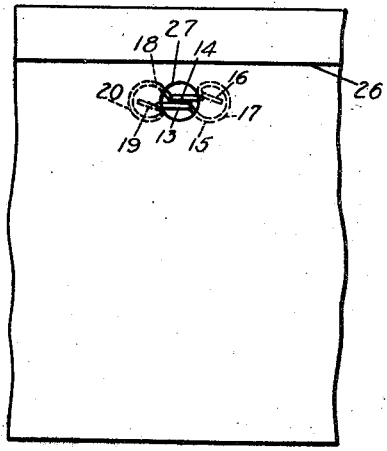
Fig. 1
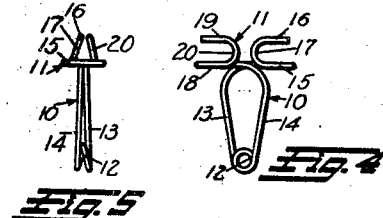
Fig. 4
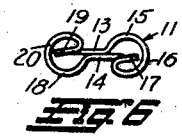
Fig. 5
Fig. 6
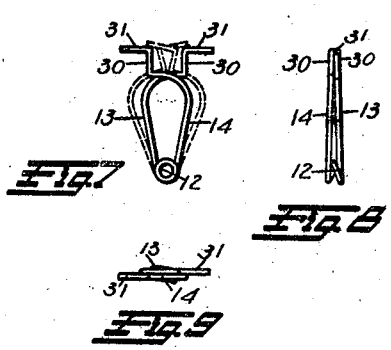
Fig. 7
Fig. 8
Fig. 9
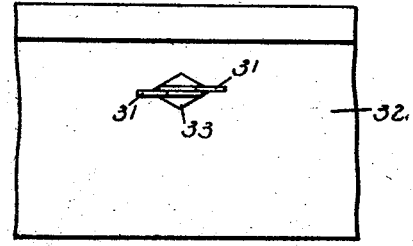
Fig. 10
Inventor
Bion C. Place
By　Strauch & Hoffman
Attorneys Patented Sept. 26, 1939

2,174,447

UNITED STATES PATENT OFFICE 2,174,447

SECURING TRIM PANELS

Bion C. Place, Detroit, Mich., assignor of one-half to George E. Gagnier, Detroit, Mich.

Application July 17, 1936, Serial No. 91,218

13 Claims. (Cl. 24—73)

This invention involves a novel fastener and arrangement for securing trim panels to the interior of automobile or similar bodies. More particularly, the invention involves an improved spring stud fastener having an improved head part designed to facilitate interlocking of the fastener with respect to foundation of the panel and to provide a connection between the head part and the foundation free of play between said part and the foundation after the fastener is in its holding position.

Trim panel spring stud fasteners of the type that are intended to be used with foundations having openings in alignment with perforations in the supporting structure, as heretofore used, were constructed in such a way that specially formed openings had to be provided in the foundation permitting the passage of the head and the subsequent interlocking of the fastener to the foundation. The formation of said openings has a tendency to weaken the foundation inasmuch as the openings are relatively large measured in several directions. In order to avoid such weakening of the foundation it has also been proposed to apply metal fastener attaching plates to the foundation at the points at which the fasteners are to be applied, said attaching plates being provided with a fastener receiving opening. The latter construction has its disadvantages inasmuch as the cost of the trim panel foundations is substantially increased by said plates.

Spring stud fasteners of the type designed for use in securing trim panels of the kind, in which the openings in the panels are aligned with the openings in the supporting structure as heretofore proposed, have also had the disadvantage that the fasteners, when assembled in the foundation, were capable of moving to a substantial degree in a direction normal to the plane of the foundation. This required great care in forcing the shanks of the fasteners in the perforations in the supporting structures, since if the pressure, forcing the fastener in position, was not applied directly against the head of the fastener said head was liable to be forced through the panel covering.

The primary purpose of the present invention is to provide a fastener designed for use in securing trim panels, the foundations of which have openings disposed in alignment with the openings in the supporting structure, which fasteners are so designed that relatively small and symmetrically formed openings can be used to bring about the desired interlock between the fastener and the foundation and in which the fastener is so constructed that after it has been assembled with respect to the foundation and force applied to press the shank in the perforation in the supporting structure, the exertion of said force will not have a tendency to cause the fastener to move in a direction normal to the plane of the foundation.

Another object of the invention is to provide an improved spring stud fastener constructed from a single piece of wire to include portions of head parts that bear against the side of the foundation opposite to that to which the upholstery material is applied.

Still another object of the invention is to provide an improved spring stud fastener including an expansible and contractible shank consisting only of two legs which carry head parts of hook-like formation, the hooks in the head part opening in opposite directions.

A still further object of the invention is to provide an improved spring stud fastener constructed of wire in such form that the contraction of the shank causes an expansion of the head into contact with opposite walls of the opening in the foundation in which the head part of the fastener is diposed.

A still further object of the invention is to provide an improved spring stud fastener constructed of wire and including two head parts that are formed to pass each other like the arms of a scissors in order that the head may be very substantially contracted, thus permitting it to be centered in an opening very much smaller than the opening in the supporting structure and subsequently expanded therein to bring about a satisfactory interlock between the fastener and the foundation.

Still further objects of the invention will appear as a description thereof proceeds with reference to the accompanying drawing in which:

Figure 1 is a rear view of a fragment of a trim panel having one of the improved fasteners interlocked with the foundation thereof through an opening of symmetrical form.

Figure 2 is a transverse sectional view taken on the plane indicated by the line 2—2 in Figure 1, the shank of the fastener being entered in an opening in a supporting structure.

Figure 3 is a diagrammatic view showing a fragment of a foundation and the fastener of the present invention having its shank expanded to contract the head in order to permit it to be entered in the opening in the foundation and showing an expanding tool in said shank.

Figures 4, 5 and 6 are respectively side, edge and plan views of the fastener included in Figures 1, 2 and 3.

Figures 7, 8 and 9 are respectively side, edge and plan views of a modified form of fastener.

Figure 10 is a view of a fragment of a trim panel provided with a preferred form of opening for the reception of the fastener of Figures 7, 8 and 9.

Like reference characters indicate like parts throughout the several figures.

The preferred form of fastener illustrated in Figures 4, 5 and 6 is constructed from a single piece of wire, properly tempered after the piece of wire has been bent in the form of the fastener, and comprises a shank part 10 and a head part 11. The shank part 10 is formed from the mid-portion of the piece of wire. The head part 11 is formed from the end of the piece of wire.

Shank part 10 comprises a single convolution of a coil 12, formed from the mid-portion of the wire, and two legs 13 and 14, the legs 13 and 14 being outwardly bowed as illustrated particularly in Figure 4. If desired, the convolution 12 may be omitted. That is, the mid-portion of the wire may be merely bent at its middle to provide the nose or entering part of the shank and to form the outwardly bowed legs 13 and 14. Said legs provide holding portions that converge toward each other adjacent the head, and guiding portions that converge toward the end of the shank part 10 in a manner and for purposes now well understood in the art.

Legs 13 and 14 are preferably disposed in crossed relation adjacent the head part 11 for a purpose presently to be described.

Head part 11 consists of two hooks, the openings of which extend in opposite directions. Said hooks are formed from the ends of the piece of wire respectively. The right hand hook, viewing Figure 4, consists of a lower arm 15 in the form of a loop. The upper arm of said hook consists of a straight portion 16 constituting the extreme end portion of the piece of wire, the arm 16 being connected to the lower arm 15 by a connecting portion 17. The left hand hook, viewing Figure 4, is similarly constructed, that is, it includes a lower arm 18 in the form of a loop, an outer arm 19 constructed from the other end of the piece of wire, and a connecting portion 20 serving to space the arm 19 above the arm 18 to an extent approximating the thickness of the foundation with which the fastener is intended to be used. It will be observed from Figure 5 of the drawing that the outer arms 16 and 19 are disposed in offset relation so that they are free to pass each other like the arms of a scissors when the shank of the fastener is expanded by forcing the legs 13 and 14 thereof apart.

In bringing the fastener just described into interlocked relation to the foundation of a trim panel, the head sections are contracted so that the outer arms 16 and 19 are disposed in side by side relation as illustrated in Figure 3 of the drawing in which 21 designates a fragment of a foundation of the trim panel having an opening 22 for the reception of a fastener intended to secure a trim panel upon a supporting frame, such as the door frame of an automobile body for example. In entering the fastener in the foundation 21, the shank of the fastener is expanded, as by inserting the arms 23 and 24 of a pair of expanding pliers between the legs 13 and 14, and expanding the pliers so as to cause the legs 13 and 14 to be widely separated. Such separational movement of the legs causes the head sections to move towards each other until the outer arms 16 and 19 are disposed in side by side relation, or approximate side by side relation. The diameter of the opening 22 exceeds somewhat the length of the arms 16 and 19 so that when said arms are in side by side relation the head part may be passed through the opening 22 until the loops 15 and 18, constituting the inner arms of the hooks, abut against the underside of the foundation. The expanding tool is then drawn from between the legs 13 and 14 and they are permitted to resume their normal position. In resuming such position, the hooks separate and return to their original position thus bringing the fastener into interlocked relation with the foundation with the hooks in engagement with opposite sides of the opening 22 therein.

The final position of the fastener is illustrated in Figures 1 and 2, in which figures the foundation 21 is provided with the usual upholstery covering 25, the margins of which are lapped around the margins of the panel as indicated at 26, as is usually the practice. In Figure 1 the fastener is shown in assembled relation to the completed panel. In Figure 2 the shank of the fastener has been entered in an aperture 27 of a metallic or like supporting structure 28. It will be observed that in forcing the shank of the fastener into the aperture 27 it is necessary to apply pressure in the direction of the length of the shank. Inasmuch as the loops 15 and 18, constituting the inner arms of the two hooks forming the head of the fastener, abut against the inside of the foundation, said loops serve to resist pressures applied in said direction so that under no circumstances can the head of the fastener be moved with respect to the foundation 21. The upholstery material 25 is thus protected and it is not necessary that pressure be applied to the panel at a point exactly opposite the fastener, which in the course of application is not clearly visible to the operator applying the panel.

It will be observed further that in contracting the shank of the fastener, as it is passed through the aperture 27, that the hooks are forced into firm engagement with opposite walls of the opening 22 in the foundation 21 inasmuch as contraction of the shank of the fastener causes the separation of the hooks constituting the head. When the fastener is in holding position, that is, in the position illustrated in Figure 2 of the drawing, the shank of the fastener is compressed somewhat from its normal position so that in said position the hooks constituting the heads are forced into firm engagement with opposite walls of the opening and maintained in this position. In this way there is no possibility of relative movement between the foundation and the fastener that secures it to the supporting structure 28.

The described construction is such as to permit ready interlock between the foundation and the fastener while at the same time providing a connection between the foundation and the fastener that does not permit movement of the fastener with respect to the foundation after the interlock has been brought about in the direction of the shank of the fastener. Since the loops 15 and 18 bear against the underside of the foundation over relatively large areas at opposite sides of the opening 22 in the foundation, it will be appreciated that the shank of the fastener is maintained definitely normal to the plane of said side of the foundation and any strains on the foundation, as a result of forcing the fastener in the perforations, are distributed over a sufficient area of the foundation to enable the latter to successfully resist them.

In the modification of the invention illustrated in Figures 7, 8 and 9, a fastener is disclosed having modified head sections. In this form of the invention the legs 13 and 14 are crossed adjacent the head section. Each head section consists of a straight portion 30 and a further straight portion 31 extending at right angles thereto. In interlocking the modified form of fastener of Figures 7, 8 and 9 with the foundation, the shank of the fastener is expanded to the dotted line position illustrated in Figure 7, such action tending to draw the head sections into side by side relation, said sections being, as illustrated, free to pass each other like the arms of a scissors. After the portions 31 have been brought side-by-side, the fastener may be passed through an opening in the foundation and the shank permitted to contract, such action serving to expand or separate the head sections, bringing the straight portions 30 into contact with opposite walls of the opening in the foundation.

Preferably, the fastener of Figures 7, 8 and 9 is used with a foundation 32 having a diamond-shaped opening 33 formed therein as shown in Figure 10. When the fastener of Figures 7, 8 and 9 is entered in the opening 33, as illustrated, the straight portions 30 engage in opposite corners of said opening, such engagement preventing rotation of the fastener within the opening. The fastener is formed so that when it is interlocked with the foundation the straight portions 30 bear yieldingly and firmly in said corners, such action being relied upon to maintain the shank of the fastener truly normal to the plane of the foundation, thus facilitating the entry of the shank in the opening in the supporting structure. If desired, the portions 31 may be bent into the form of loops either complete or partial so that the fastener may engage the foundation over a large area. Such loops are desirable when the fastener of Figures 7, 8 and 9 are used with round openings. They are not required when used with diamond-shaped openings, such as illustrated in Figure 10, because the engagement of the straight portion 30 in opposite corners of such openings serve to maintain the shank of the fastener at right angles to the foundation and additional means for this purpose are not required.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener constructed from a piece of wire comprising a shank formed from the mid-portion of the piece of wire, said shank consisting only of two outwardly-bowed legs and a head part constructed from the ends of said piece of wire and consisting of two hook-like members, each of said members comprising a loop forming one arm of the hook and a straight portion forming the other arm of the hook.

2. A spring stud fastener constructed from a piece of wire comprising a shank formed from the mid-portion, of the piece of wire, said shank consisting only of two outwardly-bowed legs and a head part constructed from the ends of said piece of wire and consisting of two hook-like members, each of said members comprising a loop forming one arm of the hook and a straight end portion forming the other arm of the hook, said legs crossing each other adjacent said members whereby contraction of the shank causes separation of said members.

3. A spring stud fastener comprising a shank in the form of an elongated loop providing two outwardly bowed legs connected together yieldingly at the end of the shank and two oppositely-opening hooks carried by said legs respectively, and forming the head of the fastener, said hooks being laterally offset each from the other so that they can be brought into side by side relation to permit entry thereof in an opening in a foundation having a cross dimension substantially smaller than the normal width of said head.

4. The fastener defined in claim 3 in which said legs are disposed in crossed relation adjacent the head whereby when said shank is contracted in entering a perforation in a supporting structure said hooks are spread apart.

5. A fastening device comprising a head, a shank, said shank comprising leg members integrally united to form a leading end for the device, said leg members extending in converging relation toward the leading end of the device and being offset with respect to each other in normal, untensioned relation to dispose certain of the longitudinal edges of the leg members in diverging relation toward the head, and means provided on said longitudinal edges adapted to engage in a work aperture to seat the device and resist withdrawal of the same from applied fastening position.

6. A fastening device comprising a head, a shank, said shank comprising leg members integrally united to form a leading end for the device, said leg members extending in diverging relation toward said head and being laterally offset with respect to each other in normal, untensioned relation, said leg members being provided with cam shoulders adapted to engage in a work aperture to seat the device in applied fastening position.

7. A fastening device comprising a head, a shank, said shank comprising leg members integrally united to form a leading end for the device, said leg members extending in converging relation toward the leading end of the device and being offset with respect to each other in normal, untensioned relation to dispose certain of the longitudinal edges of the leg members in diverging relation toward the head, said longitudinal edges having cam shoulders adapted to engage in a work aperture to seat the device in applied fastening position.

8. For use in apertured work of predetermined thickness, a separable fastening device comprising a head, a shank, said shank comprising leg members extending in diverging relation toward said head and being laterally offset with respect to each other in normal, untensioned relation, said head engaging one face of the work and said leg members being provided with a shoulder adapted to engage an opposite face of the work adjacent the aperture and cooperate with said head to retain the device in applied fastening position.

9. For use in apertured work of predetermined thickness, a separable fastening device comprising a head, a shank, said shank comprising leg members extending in diverging relation toward said head and being laterally offset with respect to each other in normal, untensioned relation, a shoulder on each leg member adapted to engage a face of the work adjacent the aperture and cooperate with said head engaging an opposite face of the work to retain the device in applied fastening position.

10. For use in apertured work of predetermined thickness, a separable fastening device comprising a head, a shank, said shank comprising leg members integrally united to form a leading end for the device, said leg members extending in converging relation toward the leading end of the device and being offset with respect to each other in normal, untensioned relation to dispose certain of the longitudinal edges of the leg members in diverging relation toward the head, said longitudinal edges being provided with shoulders adapted to engage a face of the work and cooperate with said head engaging an opposite face of the work to retain the device in applied fastening position.

11. A one-piece wire fastener for securing molding or the like to a support comprising a wire bent mid-way its ends to form a shank portion, the free ends of said wire then being crossed and bent in curved arms in a plane perpendicular to the plane of the said shank portion.

12. A spring stud fastener, consisting of a shank part comprising two outwardly bowed legs integrally flexibly united at the entering end of the shank, and a head part comprising two relatively movable hook-like members carried respectively by said legs, each of said hook-like members consisting in a pair of substantially parallel arms forming an opening between the arms bounded by spaced planes normal to the plane of movement of said legs.

13. A spring stud fastener, consisting of a shank part comprising two outwardly bowed legs integrally flexibly united at the entering end of the shank and offset from each other laterally and a head part comprising two hook-like members carried respectively by said legs, each of said hook-like members consisting in a pair of substantially parallel arms forming an opening between the arms bounded by spaced planes normal to the planes of movement of said legs, said hooks being arranged in laterally offset relation so that they may be disposed in side by side relation upon movement of said legs.

BION C. PLACE.